July 9, 1929.  J. RUTHERFORD  1,720,058
FISHING TOOL
Filed Aug. 1, 1928
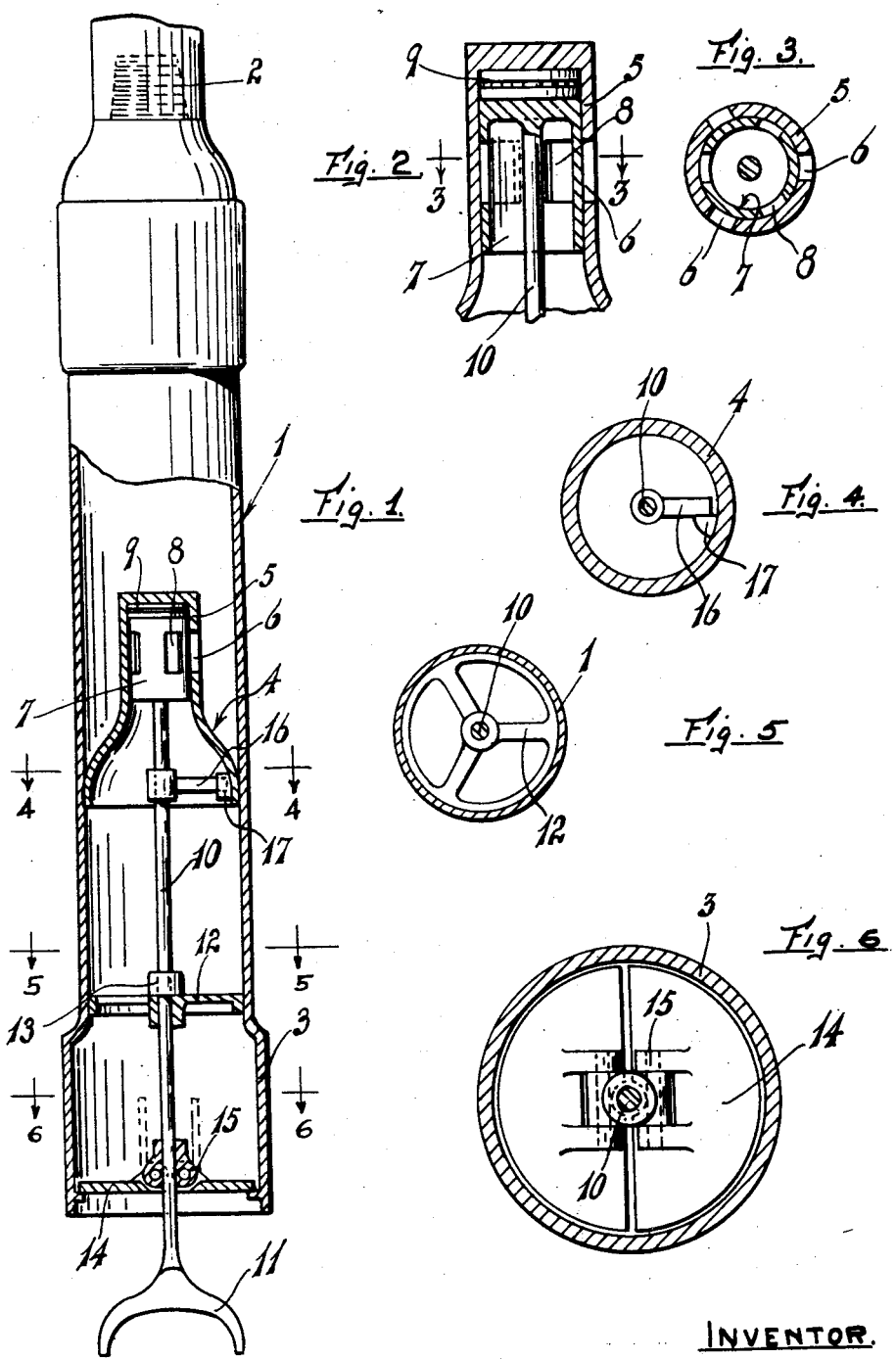
INVENTOR.
JOHN RUTHERFORD.
by
ATTORNEY.

Patented July 9, 1929.

1,720,058

UNITED STATES PATENT OFFICE.

JOHN RUTHERFORD, OF LONG BEACH, CALIFORNIA.

FISHING TOOL.

Application filed August 1, 1928. Serial No. 296,640.

This invention relates to a fishing tool which is operated by the pressure of liquid outside of and around the drill pipe to the bottom of which the tool is secured.

An object of my invention is to provide a fishing tool having means therein, whereby the liquid on the outside thereof, can be directed through the tool, thus causing a heavy rush of liquid to the tool which carries without small particles lodged on the bottom of the well.

Another object is to provide a tool of the character stated which will effectively and quickly pick up large numbers of small pieces lodged in the bottom of the well.

Still another object is to provide a fishing tool which can be quickly and easily controlled by the operator on the surface.

Other objects, advantages, and features of invention may appear from the accompanying drawing, the subjoined detailed description, and the appended claims.

In the drawing

Fig. 1 is a side elevation, partly in section, of my fishing tool.

Fig. 2 is a fragmentary longitudinal, sectional view of the cylinder and piston.

Fig. 3 is a sectional view, taken on line 3—3 Fig. 2.

Fig. 4 is a sectional view, taken on line 4—4 Fig. 1.

Fig. 5 is a sectional view taken on line 5—5 Fig. 1.

Fig. 6 is an enlarged sectional view taken on line 6—6 Fig. 1.

Referring more particularly to the drawing:

The numeral 1 indicates tubular body which is secured to the bottom of the drill pipe 2, or the like. The lower end of the body 1 is preferably enlarged as at 3, although if desired, the body may be of uniform diameter. Within the body 1 and adjacent the upper end thereof, I secured a swedge fitting 4, the lower end of which is open and the fitting is secured to the inner wall of the body by suitable means, such as welding, riveting, bolting or otherwise suitably secured in place.

The fitting 4 is provided with a cylinder 5 at the upper end thereof, and the top of this cylinder is closed for a purpose to be further described.

In the side walls of the cylinder 5, I provided the plurality of ports 6, which ports open into the upper end of the body 1 and provide a passage way between the top and bottom of said body.

A piston 7 fits closely within the cylinder 5 and the piston is provided with a plurality of openings 8 therein, which openings are adapted to register with the ports 6.

A thrust bearing 9 is positioned between the top of the piston 7 and the closed upper end of the cylinder 5, thus enabling the piston to be readily rotated as will be further described.

A rod 10 is secured to the piston 7 and extends downwardly therefrom. On the bottom of this rod I provide a sharp ground-engaging tooth 11 which is adapted to extend into the formation at the bottom of the hole and non-rotatably hold the rod and piston.

A guide spider 12 is secured inside of the body 1 and the rod 10 extends therethrough, thus holding the rod against side movement.

A stop washer 13 is secured to the rod 10 immediately above the spider 12 and rests thereon, thus limiting the downward movement of the rod and piston.

Adjacent the bottom of the body 1 I provide a pair of hingedly mounted gates 14, 14 which are adapted to swing upwardly to permit the passage of liquid and metal pieces thereby. These gates may be hinged to the body or to the rod 10 as shown at 15.

In order that the openings 8 may be properly aligned with the ports 6, I provide a stop arm 16 which is secured to the rod 10 and which engages a lug 17 on the body or fitting 4 when the openings and ports are aligned.

It will be understood that in the rotary drilling of wells, a liquid is forced into the well to lubricate the bottom and to sustain the walls thereof, and this liquid or semi-liquid fills the entire space from the top to the bottom of the well and around the drill pipe. Now when it is desired to recover articles that are lost in the bottom of the well, my fishing tool is secured to the bottom of the drill pipe and is lowered into the well. When the drill pipe and fishing tool have reached the bottom of the hole, there is a hydrostatic pressure on the liquid around the drill pipe and this pressure is very greatly due to the considerable depth of the well.

When running the tool into the well, the openings 8 are not in alignment with the ports 6, consequently no liquid enters the drill pipe. When the fishing tool reaches the bottom, the tooth 11 engages the formation and non-rotatably holds the rod 10 and piston 7. The drill pipe 2 and body 1 are now rotated until the openings 8 and ports 6 are aligned or until the stop arm 16 engages the lug 17.

When these openings are aligned as stated, there is a tremendous inrush of liquid around the bottom of the fishing tool and upwardly into the same, and this rapid movement will carry with it small metal articles that are lodged in the bottom of the well. The gates 14 serve to retain these lost articles in the tool which is now removed from the well and these articles dumped therefrom.

Having described my invention, I claim:

1. A fishing tool comprising a body, a fitting in said body dividing the same into upper and lower compartments, said fitting having openings therein, means closing said openings, said means being operable on rotation of the tool to open said openings.

2. A fishing tool comprising a body, a fitting in said body dividing the same into upper and lower compartments, said fitting having openings therein, means closing said openings, said means being operable on rotation of the tool to open said openings, and gates in said body adjacent the lower end thereof.

3. A fishing tool comprising a body, a fitting in said body, a cylinder formed in the fitting, said cylinder having ports therein, a piston in the cylinder, a rod depending from the piston, said piston having openings therein adapted to align with said ports and the rod being provided with a tooth on the bottom thereof, whereby the rod and piston are non-rotatably held.

4. A fishing tool comprising a body, a fitting in said body, a cylinder formed in the fitting, said cylinder having ports therein, a piston in the cylinder, a rod depending from the piston, said piston having openings therein adapted to align with said ports and the rod being provided with a tooth on the bottom thereof, whereby the rod and piston are non-rotatably held, gates in said body adjacent the lower end thereof, and a spider through which the rod extends.

5. A fishing tool comprising a body, a fitting in said body, a cylinder formed in the fitting, said cylinder having ports therein, a piston in the cylinder, a rod depending from the piston, said piston having openings therein adapted to align with said ports and the rod being provided with a tooth on the bottom thereof, whereby the rod and piston are non-rotatably held, gates in said body adjacent the lower end thereof, and a spider through which the rod extends, a stop collar on said rod above the spider and resting thereon, a stop arm secured to the rod and a lug against which the stop arm strikes when the openings in the cylinder and the ports are aligned.

6. A fishing tool comprising a tubular body, a swedge fitting in the body, a cylinder formed in the fitting, said cylinder having ports in the side thereof, a piston in the cylinder, a thrust bearing between the top of the piston and the cylinder, a rod depending from the piston, an earth engaging tooth on the bottom of the rod and gates in said body adjacent the lower end thereof.

7. A fishing tool comprising a tubular body, a swedge fitting in the body, a cylinder formed in the fitting, said cylinder having ports in the side thereof, a piston in the cylinder, a thrust bearing between the top of the piston and the cylinder, a rod depending from the piston, an earth engaging tooth on the bottom of the rod and gates in said body adjacent the lower end thereof, a spider in said body through which the rod extends, a stop collar round the rod resting against the spider and stop means whereby the piston is held against rotation when the openings in the piston and the ports are aligned.

In testimony whereof, I affix my signature.

JOHN RUTHERFORD.